Patented July 21, 1942

2,290,522

UNITED STATES PATENT OFFICE 2,290,522

CELLULOSE ETHER COMPOSITION

Arthur J. Barry and Earle L. Kropscott, Midland, Mich., assignors to The Dow Chemical Company, Midland, Mich., a corporation of Michigan No Drawing. Application September 21, 1940, Serial No. 357,823

13 Claims. (Cl. 106—181)

This invention relates to a cellulose ether composition and particularly to a composition adapted for the preparation of extruded or molded articles of improved surface hardness.

For many purposes, the inherent toughness and flexibility of cellulose ether compositions such as those containing ethyl cellulose, for example, when considered together with the flow characteristics of the cellulose ether under molding conditions, makes the cellulose ethers particularly desirable for the preparation of molded articles. It is common practice to include in the composition a plasticizer which serves either to soften the composition at room temperature or to lower the flow point during a molding or extrusion operation. Most plasticizers, however, fail to increase the surface hardness of the molded product as compared with that of ethyl cellulose alone. It is frequently desired to provide molded articles having a greater surface hardness than can be obtained from the usual cellulose ether molding plastics while retaining the desirable characteristics of the cellulose ether.

It is accordingly among the objects of the invention to provide a composition of matter of particular utility in the preparation of molded or extruded articles from cellulose ethers, the said composition when molded exhibiting an improved toughness and surface hardness. Another object is to provide a molded article comprising a cellulose ether such as ethyl cellulose and having improved surface hardness as compared with a like article made from the cellulose ether alone or from the plasticized cellulose ether. Other related objects will appear hereinafter.

It has now been found that the foregoing and related objects may be attained through the employment as a molding composition of a mixture in a suitable state of subdivision of a thermoplastic cellulose ether and an amount, not exceeding the theoretical quantity, of an anhydride of a dicarboxylic acid to react with the remaining free hydroxyl groups in the cellulose ether. To illustrate, if the cellulose ether to be molded contains 2.4 etherifying groups per $C_6$ unit, it must contain correspondingly 0.6 hydroxyl group per $C_6$ unit. The amount of dicarboxylic acid anhydride employed to prepare the molding composition of the present invention would, in such case, not exceed 0.6 mole. Preferably there is employed at least 40 and usually about 70 to 80 per cent of the theoretical amount of the anhydride which would be required to react with the remaining free hydroxyls in the cellulose ether. The compositions comprising the cellulose ether and the dicarboxylic acid anhydride, when molded or extruded in the customary manner under the usual conditions of elevated temperature and pressure, are found to give shaped articles of increased surface hardness as compared with those made under like conditions from a similar composition without the anhydride, and the said articles are found to be somewhat more resistant to (or, conversely, less susceptible to) the action of solvents for the cellulose ether than are articles made in like manner but without the anhydride.

Among the dicarboxylic acid anhydrides which may be employed are phthalic anhydride, succinic anhydride, maleic anhydride, naphthalic anhydride, and the like, all of which are solid materials which are usually incorporated in the cellulose ether, either by hot compounding or by solvent colloiding in methods well known to the plastic art.

The following examples illustrate the practice of the invention:

Example 1

A molding powder was prepared containing ethyl cellulose (46 per cent ethoxy content)—234 parts; phthalic anhydride—74 parts; and stearic acid—2 parts. The phthalic anhydride was added to the ethyl cellulose and stearic acid by the well known procedure of "solvent colloiding" using an 80–20 mixture of toluene and ethanol as the solvent. After the ingredients had been intimately mixed, the plastic mass was worked on a two-roll mill at about 120° C. until freed from solvent and then was cooled until solid, and ground to form a molding powder. The powder was molded at 140° C. under a pressure of 3000 pounds per square inch. The molded article exhibited a hard, smooth and scratch resistant surface.

Example 2

In a manner similar to that described in the preceding example, a molding powder was prepared from ethyl cellulose of 47 per cent ethoxy content and about 75 per cent of the theoretical amount of phthalic anhydride necessary to react with the available hydroxyl groups of the ethyl cellulose. Molded articles produced from the powder had much harder surfaces than those produced from the heretofore customary ethyl cellulose molding plastics.

Example 3

In the manner previously described, molding powders were made from ethyl cellulose (and from other cellulose ethers) and from 70 to 80 per cent of the theoretical amount of maleic anhydride, succinic anhydride, or naphthalic anhydride. In each case, the surface hardness of the molded article was improved as compared with the control specimens from which the anhydride had been omitted. In general, the improvement evidenced by the use of the new compositions was of the order of two degrees of hardness in the "Venus pencil scale." The hardness test employed consists of writing on the surface to be tested with a pencil having a freshly sharpened but slightly rounded point using a pressure just less than that necessary to break the pencil. The softest pencil making an indentation in the surface is taken as reporting the hardness of that surface. In the compositions illustrated in the preceding examples, the average improvement over the blank was from a 4H to a 6H hardness on the Venus pencil scale. The method employed, though arbitrary, gives reproducible results when employed by different operators.

In addition to improved surface hardness, the moldings produced from the present compositions have increased resistance to solvents. The products are not completely insoluble in the ethyl cellulose solvents but their resistance to such solvents is sufficiently increased so that the time required to effect solution is greatly prolonged. This property, though of secondary importance in the usual molded articles, is often definitely desired where the article may come in contact, even accidentally, with active solvents since with the present compositions less injury will result from such contact than would be the case with the heretofore employed cellulose ether molding compositions.

It has been discovered that the herein described compositions, when molded, produce articles which are not only harder and more resistant to solvents than those previously known, but also that the molded articles exhibit a much improved resistance to darkening or prolonged exposure to heat. For example, two molded articles, one made by the conventional method and from the usual plasticized composition, and the other containing phthalic anhydride and prepared as in Example 1, were heated for 2 hours at 200° C. The former was dark and badly decomposed at the end of this treatment, while the latter, while somewhat brittle, had acquired no discoloration.

The invention has been illustrated with respect to ethyl cellulose as the cellulose ether. Other cellulose ethers capable of being molded may, of course, be employed. Purely by way of example of such ethers may be named propyl cellulose, butyl cellulose, benzyl cellulose, ethyl benzyl cellulose, methyl ethyl celluolse, ethyl lauryl cellulose, and the like. The dicarboxylic acid anhydrides employed may be any of such materials which are substantially non-volatile under the combined conditions of temperature and pressure employed in the molding or extrusion operation.

In addition to the cellulose ether and the anhydride, the present compositions may contain plasticizers to lower the flow temperature during molding operations, and it is found that the molded articles have greater surface hardness than have similar articles made from the cellulose ether and plasticizer alone.

Other modes of applying the principle of our invention may be employed instead of those explained, change being made as regards the materials employed, provided the ingredients stated by any of the following claims or the equivalent of such stated ingredients be employed.

We therefore particularly point out and distinctly claim as our invention:

1. A composition particularly adapted for molding and extrusion purposes, consisting essentially of a thermoplastic cellulose ether and a dicarboxylic acid anhydride in amount from about 0.5 to 1 mol for each hydroxyl group remaining per $C_6$ unit in the said cellulose ether.

2. A composition particularly adapted for molding and extrusion purposes, consisting essentially of a thermoplastic cellulose ether and a dicarboxylic acid anhydride in amount from about .7 to .8 mol for each hydroxyl group remaining per $C_6$ unit in the said cellulose ether.

3. A composition particularly adapted for molding and extrusion purposes, consisting essentially of a thermoplastic ethyl cellulose and a dicarboxylic acid anhydride in amount from about 0.5 to 1 mol for each hydroxyl group remaining per $C_6$ unit in the said ethyl cellulose.

4. A composition particularly adapted for molding and extrusion purposes, consisting essentially of a thermoplastic ethyl cellulose and a dicarboxylic acid anhydride in amount from about .7 to .8 mol for each hydroxyl group remaining per $C_6$ unit in the said ethyl cellulose.

5. A composition particularly adapted for molding and extrusion purposes, consisting essentially of a thermoplastic ethyl cellulose and phthalic anhydride in amount from about 0.5 to 1 mol for each hydroxyl group remaining per $C_6$ unit in the said ethyl cellulose.

6. A composition particularly adapted for molding and extrusion purposes, consisting essentially of a thermoplastic ethyl cellulose and phthalic anhydride in amount from about .7 to .8 mol for each hydroxyl group remaining per $C_6$ unit in the said ethyl cellulose.

7. A composition particularly adapted for molding and extrusion purposes, consisting essentially of a thermoplastic ethyl cellulose and succinic anhydride in amount from about 0.5 to 1 mol for each hydroxyl group remaining per $C_6$ unit in the said ethyl cellulose.

8. A composition particularly adapted for molding and extrusion purposes, consisting essentially of a thermoplastic ethyl cellulose and succinic anhydride in amount from about .7 to .8 mol for each hydroxyl group remaining per $C_6$ unit in the said ethyl cellulose.

9. A composition particularly adapted for molding and extrusion purposes, consisting essentially of a thermoplastic ethyl cellulose and maleic anhydride in amount from about 0.5 to 1 mol for each hydroxyl group remaining per $C_6$ unit in the said ethyl cellulose.

10. A composition particularly adapted for molding and extrusion purposes, consisting essentially of a thermoplastic ethyl cellulose and maleic anhydride in amount from about .7 to .8 mol for each hydroxyl group remaining per $C_6$ unit in the said ethyl cellulose.

11. A molded article consisting essentially of a thermoplastic cellulose ether and a dicarboxylic acid anhydride in amount from about 0.5 to 1 mol for each hydroxyl group remaining per $C_6$ unit in the said cellulose ether, said article having improved surface hardness as compared with that of a similarly made article of the same composition but without the anhydride.

12. A molded article consisting essentially of a thermoplastic ethyl cellulose and a dicarboxylic acid anhydride in amount from about 0.5 to 1 mol for each hydroxyl group remaining per C₆ unit in the said ethyl cellulose, said article having improved surface hardness as compared with that of a similarly made article of the same composition but without the anhydride.

13. A molded article consisting essentially of a thermoplastic ethyl cellulose and phthalic anhydride in amount from about 0.5 to 1 mol for each hydroxyl group remaining per C₆ unit in the said ethyl cellulose, said article having improved surface hardness as compared with that of a similarly made article of the same composition but without the anhydride.

ARTHUR J. BARRY.
EARLE L. KROPSCOTT.